June 19, 1962 W. G. EGAN 3,039,172
PROTECTIVE CLOTHING FOR RADAR WORKERS
Filed Jan. 7, 1958 2 Sheets-Sheet 1
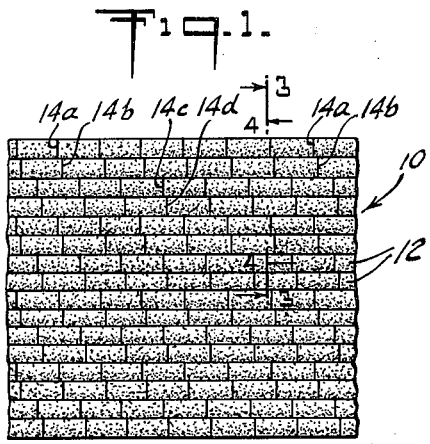
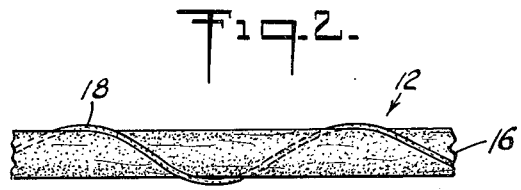
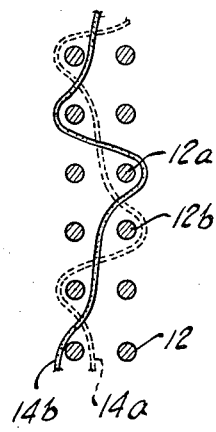
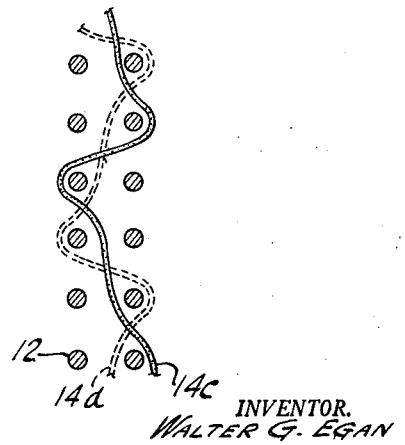
INVENTOR.
WALTER G. EGAN
BY
George Sipkin
Lee J. Huntzberger
ATTORNEYS

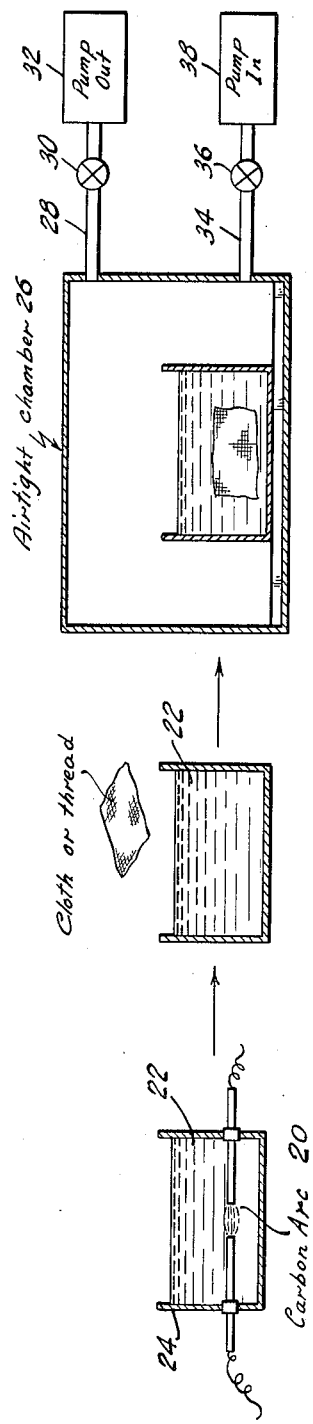

3,039,172
PROTECTIVE CLOTHING FOR RADAR WORKERS
Walter G. Egan, 107—56 113th St.,
Richmond Hill 19, N.Y.
Filed Jan. 7, 1958, Ser. No. 707,649
10 Claims. (Cl. 28—80)
(Granted under Title 35, U.S. Code (1952), sec. 266)

The invention described herein may be manufactured and used by or for the Government of the United States of America for governmental purposes without the payment of any royalties thereon or therefor.

This invention relates to substantially non-reflective, pliable, light-weight electromagnetic radiation shielding effective in the wavelength range extending from approximately one meter to 0.01 centimeters, otherwise known as the microwave region of the electromagnetic spectrum, and more particularly to protective garments with these properties.

A considerable number of persons have been injured and at least one person has died recently following exposure to microwave radiation. Unless new and better safety procedures are adopted the number of exposure cases per year may be expected to increase because the number of sources of this hazard, e.g., radar equipments, increase continuously. One United States Government agency that operates a great deal of microwave equipment has deemed that more than 0.06 average watts per square centimeter is dangerous to human tissue. Most radar transmitters, microwave relay links, and the like, provide much more than 0.06 average watts per square centimeter at their outputs and some of the late model high power radars, particularly those adapted for forward scatter propagation generate many times more average power than that. Any person who is adjacent the antenna of a radar or microwave relay link or the like, and in the radiation field when the equipment is generating substantial power, sustains tissue injury. The seriousness of an injury depends on the power level to which the individual is exposed and to the duration of the exposure.

Installation, repair, adjustment, and field measurements are examples of tasks that must be performed on microwave equipment by technicians standing near or contiguous with the equipment, sometimes right at the mouth of an antenna. The usual procedure followed in carrying out these tasks is to shut down the equipment so that the technician is not exposed to radiation. This procedure has serious drawbacks. Operation of the equipment during the repair or adjustment period may be vital. Also some tasks such as adjustments or measurements take much time and clambering about by technicians because the equipment needs to be turned on and off many times during the performance of these and like tasks. This procedure of shutting down and then turning on an equipment involves careful coordination between operator and technician lest the equipment be turned on at the wrong moment. There is an inherent danger from misinterpretation or human failure. Also, routing periodic inspections of equipments, particularly inspection of antennas, during equipment operation is desirable if radiation danger is obviated.

There are similar problems when microwave equipment is repaired or adjusted in a shop where there are many people engaged in a variety of nonrelated tasks. Personnel close by are endangered if microwave equipment is turned on to generate high power to check the progress of the work accomplished; even if the microwave equipment is turned on so that the level of power generated is not dangerous to personnel, it is probable that there will be electromagnetic interference with or by nonrelated electronic equipment about the shop.

Metal shielding is not a satisfactory solution to the above problems. A metal suit of armor for a technician is unsatisfactory because it greatly reduces mobility and is very fatiguing. Also, a metal suit that intercepts microwave radiation may develop dangerously high voltages at the joints. Also, metal does not provide resistance in depth so its ability to absorb microwave energy is small; consequently metal reflects a major portion of incident microwave energy. Reflection of the energy is undesirable because a dangerous amount of the microwave energy may be directed toward other people who would otherwise be in positions of safety. Also reflections can distort an antenna field pattern thereby interfering with antenna adjustments and field pattern measurements.

An object of this invention is to provide an inexpensive and practical solution to the above described problems.

A further object is to provide a lightweight pliable microwave shielding material that substantially attenuates microwave energy intercepted thereby and reflects only a negligible percentage of the intercepted energy and has substantially no leakage paths that can permit stray effects.

A further object is to provide a comparatively lightweight pliable microwave shielding material that converts substantially all the microwave energy intercepted thereby into heat which it radiates.

A further object is to provide clothing in accordance with the preceding objects whereby the wearer is afforded maximum protection against microwave radiation and can bend and move his limbs freely and is not encumbered by burdensome weight and bulk.

A further object is to provide tents, drapery, and throw cloths in accordance with the preceding objects for shielding people, animals, or inanimate objects from undesirable microwave radiation.

A further object is to provide a method of making lightweight pliable microwave shielding material for use as garments, tents, draperies, throw cloths and the like.

Other objects and many of the attendant advantages of this invention will be readily appreciated as the same becomes better understood by reference to the following detailed description when considered in connection with the accompanying drawings wherein:

FIG. 1 is an isometric view of a swatch of cloth in accordance with one embodiment of this invention, FIG. 2 is an enlarged view of an end (as opposed to pick) thread of the cloth of FIG. 1, FIGS. 3 and 4 are enlarged fragmented sectional views taken at 3—3 and 4—4 respectively of FIG. 1, one of the two pick threads in each figure being shown in broken lines to differentiate the two pick threads, and not showing any impregnant, and FIG. 5 illustrates a method in accordance with this invention.

The cloth 10 shown in FIG. 1 comprises comparatively thick end threads 12 and comparatively thin pick threads 14, both of cotton. End threads 12, one of which is shown enlarged in FIG. 2, are formed with a core 16 of loosely spun mercerized yarn and tightly spun thread 18 which is substantially identical to pick threads 14, spirally wound about core 16 to strengthen the end threads 12. There are two layers of the end threads 12. The weave is loose and is shown in detail in FIGS. 1, 3, and 4. The weave pattern repeats every four pick threads as follows 14a, 14b, 14c, 14d, 14a, 14b etc. The pick threads are paired; threads 14a and 14b are adjacent and threads 14c and 14d are adjacent. Successive pairs of pick threads are spaced apart a distance that is on the order of the thickness of an end thread 12. The pick threads pass back and forth through the two superposed layers of ends 12 tying the layers together. In each complete pass of a pick thread from one layer of ends to the other layer and back to the same layer it includes one end thread of one of the layers and three end threads of the other layer. Each pick of four successive picks includes, in its passes back and forth through the layers, different groups of end threads. Because the pick threads of each pair are contiguous, the end threads are firmly gripped frictionally and do not shift even when one is grasped and tugged. Also the two picks of each pair of picks are not merely displayed by one end thread as would appear from FIG. 1. Their back and forth passes through the layers of end threads if viewed in opposite directions define like paths. In other words, the path of pick thread 14b from the bottom of the figure upward is similar to the path of pick thread 14a from the top of the figure downward. In other words, the path of pick 14b starting from end thread 12a and proceeding in the upward direction is similar to the path of pick 14a starting from end thread 12b and proceeding in the downward direction. This inversion contributes to the firm grip between picks and ends. The passes of every pair of picks through the ends are substantially identical. In other words if the passes of each pair of picks through the ends is viewed sidewise, the passes of every pair of picks are substantially identical in the geometrical sense. However, the passes of each pair of picks is displaced two end threads 12 with respect to the passes of the succeeding pair of picks. With this weave pattern the cloth does not tighten or bundle up due to shrinkage, rough handling, or the like.

The cloth is thoroughly impregnated with colloidal graphite particles so that there are particles between and around the fibers forming the threads and between the threads. Because the weave is loose and because there is space between each pair of pick threads, the cloth retains a large amount of graphite, which is not dislodged to any substantial extent because of the double layer of ends and the firm grip between picks and ends that prevents shifting of threads. The graphite impregnated cloth has good electrical and heat conductivity, is pliable, and not very heavy; and it can radiate heat in the manner of a black body radiator.

One example of a cloth design in accordance with the above description is as follows:

(a) Twenty ends 12 per inch per layer of ends
(b) Core 16 of the ends 12 is of mercerized cotton fibers 10 to 17 microns diameter and 0.1 to 1 inch long loosely spun into yarn 0.045 inch diameter
(c) 46 picks per inch
(d) Pick fibers are about 17 microns diameter and about 0.5 inch long spun into thread about 0.010 inch diameter
(e) Spiral thread 18 is substantially the same as pick 14
(f) Weight of the cloth exclusive of graphite impregnant is about 0.277 gram per square inch
(g) Diameter of colloidal graphite particles is on the order of a few microns
(h) Weight of the cloth including the graphite impregnant is about 0.800 gram per square inch of cloth
(i) Density of the impregnated cloth is about 1.46.

This particular design has an attenuation factor of about 600 to 1 to radiation of about 0.3 centimeter wavelength. It re-radiates absorbed energy as harmless low temperature heat energy. The reflection from this cloth is small and has negligible effect on a field pattern. The attenuation of the cloth is higher to shorter wavelength microwaves due to skin effect. Also, the attenuation is greater for higher power than for lower power because graphite is a semiconductor and has a negative resistance characteristic with respect to temperature and thus conducts better as its temperature rises.

The cloth described can be used as curtains for doorways, as throw cloths for shielding nearby items of electronic equipment that are in operation, for making microwave shielding tents, or by making clothing for microwave equipment technicians. When made into tents or clothing or other types of shielding that must be sewn together, graphite impregnated cloth sections are sewn together with graphite impregnated threads and the stitches are tight, closely spaced, and there are a plurality of rows of stitching at each seam. This ensures good electrical and heat conductivity and good shielding at the seams. If there is need for an adjustable closure, a metal zipper electrically and thermally contacting the graphite rather than buttons, hooks, etc., is used to ensure good electrical and heat conductivity and good shielding. To ensure that the zipper does not reflect microwaves thereby interfering with measurements, the zipper is sewn in so that it is overlapped by the cloth.

After all the necessary sewing is completed, the cloth may be lightly brushed to remove excess surface graphite. A thin film of lacquer such as polyethylene can be applied to the finished product to aid the cloth in retaining the particles. The lacquer must not be applied until sewing is completed so as not to interfere with conductivity between sections. It is to be noted that the film of lacquer prevents free circulation of air. Where free circulation of air is essential to limit temperature rise, the cloth is not coated by lacquer. Though this may result in a shorter effective life due to loss of graphite through repeated handling, this disadvantage is balanced against the advantage of better air circulation.

A novel method of impregnating the cloth is disclosed in FIG. 5. A carbon arc 20 is established under slightly alkaline water 22 in a container 24. Graphite particles on the order of a few microns in diameter are obtained from the carbon arc and are colloidally dispersed in the water. Unless the water were slightly alkaline, the graphite particles, because of surface properties, would not disperse. Ammonia in the water serves as a good dispersion vehicle. The colloidal dispersion is made fairly dense. Then it is ready for impregnating the cloth, or yarn, or thread. The fibrous material, e.g., cotton, is immersed in the dense colloidal dispersion and the colloidal dispersion is disposed in an air-tight chamber 26. An air outlet 28 having a valve 30 connects the chamber to an evacuation pump 32. An air inlet 34 having a valve 36 connects the chamber to a pressure pump 38. First the valve 36 is closed, the valve 30 is opened and the pump 32 is started; the pressure is reduced toward a vacuum. The valve 30 is closed and then the pump 32 is shut down. The valve 36 is opened and the pump 38 is turned on so that the pressure in the chamber is elevated rapidly. The pressure is increased substantially above atmospheric pressure and then pump 38 is shut and the pressure is permitted to return to atmospheric pressure. Then the impregnated material is removed from the colloidal dispersion and permitted to dry.

The graphite particles can be prepared by a ball mill rather than a carbon arc but the cost is higher. The cloth can be impregnated by pressing the colloidal graphite into the material; though less expensive than the impregnation method described above, not as much graphite can be forced into the cloth and nowhere near as uniform impregnation can be achieved. For maximum impregnation; the yarn or thread is impregnated by the evacuation method before being woven into cloth and then the woven cloth is impregnated by the evacuation method.

Cotton has several characteristics which are of particular significance in this invention. First, cotton has a great affinity for water because the cellulose forms a solid solution with water. Therefore, water containing colloidal graphite can permeate cotton. Second, cotton can adsorb a large quantity of water on its surface area and therefore can adsorb a large quantity of colloidal graphite carried by water. Third, cotton has an affinity to slightly alkaline water solutions, one of these alkaline water solutions being aqueous ammonia. Hence, the slight alkalinity not only aids in dispersing the colloidal graphite particles but also enhances impregnation of cotton with colloidal graphite dispersed in water. Fourth, cotton can deposit colloids out of solutions. For all of these reasons cotton can be densely and uniformly impregnated with colloidal graphite particles by the method described above. Mercerized cotton particularly has tremendous impregnant absorbing and retaining power and therefore is recommended for the core 16 of the end threads.

Viscose rayon is one good substitute for mercerized cotton in this invention but it has less adsorptive capacity. Unmercerized cotton and other vegetable fibers can be used for strength or other characteristics but none are able to retain as much colloidal graphite as the cotton cloth described. Animal fibers are not satisfactory primarily because they do not have sufficient adsorptive capacity.

A thin sheet of pliable plastic loaded with graphite can be used but it has several disadvantages over the woven cloth described. It is less flexible, is heavier, and does not permit free circulation of air.

Graphite is not the only possible semiconductor impregnant. Colloidal dispersions of metals such as chromium, gold, silver, aluminum, or copper can be used as impregnants but they would contribute more weight than graphite, would radiate heat less readily than graphite and would reflect more of the incident energy than graphite.

Charged particles, namely free electrons in conductor materials and in some semiconductor materials and "holes" in other semiconductor materials comprise the mechanism by which these materials are able to convert into heat part of any electromagnetic microwave radiant energy incident thereto; these materials, in effect, can absorb or abstract energy from intercepted electromagnetic microwave radiant energy. Electromagnetic microwave radiant energy comprises an electric field and a magnetic field. Free electrons or "holes" in the above-mentioned materials are caused to move about by the electric and/or magnetic fields resulting in current flow; the motions of the charged particles caused by the intercepted radiant energy absorb energy therefrom. Examples of conductor materials that can absorb electromagnetic microwave energy include copper, silver, iron, mercury, and the like, singly or in combination. Examples of semiconductor materials that absorb electromagnetic microwave radiant energy include carbon, silicon, germanium, germanium with trace amounts of phosphorous or antimony.

The energy absorption process referred to above depends upon the quantity of charged particles available in the material. Secondly, it depends upon the impedance of the energy absorbing material as compared to air because the greater the mismatch of impedances of the absorbing material and air, the lower the energy absorptiveness of the material. Thirdly, it depends upon the atomic or lattice structure because rate of energy transfer from the charged particles to the surrounding material is directly related to this structure. The above characteristics differ in the various conductor and semiconductor materials. Particle graphite has a satisfactory combination of these characteristics for this invention.

Absorption of microwave radiation energy by matter is a continuous process similar to the ohmic heating of a conductor by a low frequency current. When a low frequency current flows through a conductor, heating is a substantially continuous process because there are so many closely adjacent energy states that there is a substantially continuous energy spectrum. When charged particles absorb energy from a microwave field, this absorbed energy is converted into kinetic energy of the charged particles and the kinetic energy is dissipated by collisions of the particles with atoms whereby the absorbed energy appears as heat.

Human tissue has substantial conductivity and can absorb microwave radiation but the tissue may be damaged or even destroyed when it does so because of rise in temperature in the tissue. There is little or no warning in the form of pain or discomfort attending injury from microwave radiation. This is understandable because damage occurs beneath the skin and sensory nerves which can provide a warning are in the skin and not in tissue beneath the skin. Impedances are not matched at the skin but somewhere beneath the skin, so that negligible energy is absorbed at the skin but substantially all of the energy that is absorbed is absorbed beneath the skin where there are no sensory nerves. As live tissue absorbs microwave energy the temperature of the tissue rises due to ohmic heating. When the tissue temperature is elevated beyond the temperature tolerance for the cells, the cells die. The average temperature rise in the tissue absorbing microwaves is related to the average microwave power. Tissue heat is dissipated by conduction and by blood circulation. Blood vessels beneath the skin are sparser than in the skin. If the microwave power is low enough, the heating is gradual and can be dissipated by conduction and blood circulation thereby causing no damage. If the average microwave power absorbed is higher than this or if there are sharply peaked surges of microwave power (high power radar pulses), tissue damage from heating will be appreciable. Also, human tissue is largely composed of protein and fat molecules, and protein molecules when subjected to high energies as in radar pulses are disassociated into different molecules resulting in destruction of the tissue.

Graphite impregnated cloth garments in accordance with this invention protect the wearer from the hazards of microwave radiation by attenuating incident microwaves to safe levels. Multi-ply cloth can be used for attenuating higher power microwaves. Because it is a black body, it can readily re-radiate heat that is developed. Because resistivity in this invention is distributed in thickness, impedance of air is closely matched and there is little reflection. Because it is a black body it can readily re-radiate heat energy that is developed whereby the temperature rise does not reach a dangerous level. Because the cloth is pliable and comparatively lightweight it does not greatly limit mobility and agility of the wearer. Curtains, tents, throw cloths and the like provide similar advantages.

This invention does not afford protection for the eyes. For eye protection, attention is invited to this applicant's copending U.S. patent application, Serial Number 707,648, filed January 7, 1958, for Light Transparent Microwave Shielding Devices.

Obviously many modifications and variations of the present invention are possible in the light of the above teachings. It is therefore to be understood that within the scope of the appended claims the invention may be practiced otherwise than as specifically described.

I claim:

1. Pliable sheet material having good electrical and heat conductivity properties for use as microwave shielding comprising cloth and a substantially continuous semiconductor impregnant of very small compressed together graphite particles on the order of several microns diameter therein, substantially all of said particles being in thermal and electrical contact with adjacent particles, said particles being disposed between and among and within any recesses in the fibers and threads thereof, the weight of the graphite per unit area of said cloth exceeding the unit area weight of the cloth.

2. A microwave shielding cloth that is pliable, comprising a fabric of substantially all mercerized cotton including two superposed layers of ends for good adsorptive capacity to impregnants, picks passing back and forth through said superposed layers of ends and tying said layers together, each of said picks in each complete pass from one layer of ends to the other layer and back again embracing one end of one layer and a plurality of ends of the other layer, the plurality of ends embraced in two successive passes being alternately first in one layer and then in the other layer of ends, said picks being in pairs, the two threads of each pair being contiguous, the diameter of an end being several times the diameter of a pick, and the spacing between said pairs of picks being on the order of the diameter of an end, the two picks of each pair tracing similar paths through the ends but in opposite directions, successive pairs of picks tracing like paths through said ends but displaced apart by a plurality of ends, successive picks embracing different groups of ends in each pass, whereby the cloth does not bunch or wrap or shrink unevenly, a semiconductor impregnant of compressed together colloidal graphite particles on the order of several microns in diameter permeating said fabric, the weight of the graphite per unit area of the cloth exceeds the unit area weight of the cloth, the weight of impregnated cloth being the major part of a gram per square inch.

3. A cloth as defined in claim 2 wherein said ends include a loosely spun mercerized cotton core and a tightly spun thin thread of unmercerized cotton spirally wound with a comparatively long lead about the core whereby the cloth can adsorb and retain a very large amount of colloidal graphite.

4. A cloth as defined in claim 2 wherein said picks embrace one end of one layer and three ends of the other layer in each complete pass.

5. A cloth as defined in claim 4 wherein each complete pass of a pick it traces a path that begins at one side of the cloth and extends transversely through the cloth past an end of one layer and past the end superposed thereon then about the latter and between the layers, coming out said one side of the cloth at a spacing of four ends from the beginning of the pass.

6. A porous, pliable article of outer clothing having good electrical and heat conductivity properties and which permits heat transfer therethrough by convection, for use as microwave shielding by radar workers and the like comprising cloth and a substantially continuous semiconductor impregnant in the form of very small compressed together particles on the order of microns diameter therein, substantially all of said particles being in thermal and electrical contact with adjacent particles, said particles being disposed between and among and within any recesses in the fibers and threads thereof, the weight of impregnant per unit area of the cloth exceeding the unit area weight of the cloth, the weight of impregnated cloth being the major part of a gram per square inch, said clothing converting incident microwave radiation into heat and radiating the heat and permitting air to pass therethrough to further dissipate heat.

7. An article of outer clothing as defined in claim 6 wherein said particles are graphite particles and said cloth is of mercerized cotton fibers.

8. An article of outer clothing as defined in claim 6 wherein said cloth comprises two superposed layers of ends, picks passing back and forth through said superposed layers of ends and tying said layers together, each of said picks in each complete pass from one layer of ends to the other layer and back again embracing one end of one layer and a plurality of ends of the other layer, the plurality of ends embraced in two successive passes being alternately first in one layer and then in the other layer of ends, each said pick being a pair of threads, the two threads of each pair being contiguous, the diameter of an end being several times the diameter of a pick, and the spacing between said pairs of picks being on the order of the diameter of an end, the two picks of each pair tracing similar paths through the ends but in opposite directions, successive pairs of picks tracing like paths through said ends but displaced apart by a plurality of ends, successive picks embracing different groups of ends in each pass.

9. A porous, pliable article of outer clothing having good electrical and heat conductivity properties and which permits heat transfer therethrough by convection, for use as microwave shielding by radar workers and the like comprising cloth of mercerized cotton fibers, said clothing including two superposed layers of ends, picks passing back and forth through said superposed layers of ends and tying said layers together, each of said picks in each complete pass from one layer of ends to the other layer and back again embracing one end of one layer and a plurality of ends of the other layer, the plurality of ends embraced in two successive passes being alternately first in one layer and then in the other layer of ends, each said pick being a pair of threads, the two threads of each pair being contiguous, the diameter of an end being several times the diameter of a pick, and the spacing between said pairs of picks being on the order of the diameter of an end, the two picks of each pair tracing similar paths through the ends but in opposite directions, successive pairs of picks tracing like paths through said ends but displaced apart by a plurality of ends, successive picks embracing different groups of ends in each pass; and a substantially continuous semiconductor impregnant of compressed together graphite particles that are on the order of several microns diameter, substantially all of said particles being in thermal and electrical contact with adjacent particles, said particles being disposed between and among and within any recesses in the fibers and threads thereof, the weight of impregnant per unit area of the cloth exceeding the unit area weight of the cloth, the weight of impregnated cloth being the major part of a gram per square inch, said clothing converting incident microwave radiation into heat and radiating the heat and permitting air to pass therethrough to further dissipate heat.

10. An article of clothing as defined in claim 9 wherein said ends include a loosely spun mercerized cotton core and a tightly spun thin thread of unmercerized cotton spirally wound with a comparatively long lead above the core whereby the cloth can adsorb and retain a very large amount of said graphite.

References Cited in the file of this patent

UNITED STATES PATENTS

| | | |
|---|---|---|
| 514,460 | Hayward | Feb. 13, 1894 |
| 585,626 | Hirsch | June 29, 1897 |
| 1,327,904 | Carter | Jan. 13, 1920 |
| 1,885,015 | McIlroy | Oct. 25, 1932 |
| 2,107,295 | Hawley | Feb. 8, 1938 |
| 2,270,154 | Whittier | Jan. 13, 1942 |
| 2,332,817 | Smith | Oct. 26, 1943 |
| 2,443,782 | Barnard et al. | June 22, 1948 |
| 2,472,512 | Benthall | June 7, 1949 |
| 2,567,379 | Kienow | Sept. 11, 1951 |
| 2,570,576 | Lord | Oct. 9, 1951 |
| 2,630,620 | Rand | Mar. 10, 1953 |
| 2,704,731 | Trusler et al. | Mar. 22, 1955 |